United States Patent [19]

O'Shaughnessy et al.

[11] Patent Number: 5,689,232
[45] Date of Patent: Nov. 18, 1997

[54] VEHICLE SIGNALLING DEVICE

[76] Inventors: Michael Francis O'Shaughnessy, Athanor, Kiltymon, Newcastle County Wicklow; Donal McDonald, 145 Carrigwood, Firhouse, Dublin 24, both of Ireland

[21] Appl. No.: 187,822

[22] Filed: Jan. 27, 1994

Related U.S. Application Data

[63] Continuation of Ser. No. 64,359, May 8, 1993, abandoned, which is a continuation of Ser. No. 854,374, Mar. 19, 1992, abandoned.

[30] Foreign Application Priority Data

Mar. 19, 1991 [IE] Ireland .................................. 903/91

[51] Int. Cl.⁶ .................................................. B60Q 1/00
[52] U.S. Cl. .................... 340/468; 340/321; 340/427; 340/432; 340/465; 340/474; 340/475; 362/72; 362/198; 116/53
[58] Field of Search ........................ 340/321, 427, 340/432, 463, 465, 468, 474, 475; 248/160; 362/72, 198; 116/28 R, 35 R, 51, 52, 53, 54

[56] References Cited

U.S. PATENT DOCUMENTS

| | | | |
|---|---|---|---|
| 2,416,160 | 2/1947 | Davidsson | 340/432 |
| 3,945,337 | 3/1976 | Sweetman | 116/28 R |
| 3,950,727 | 4/1976 | Smith | 362/72 |
| 3,961,596 | 6/1976 | Schiauone | 116/52 |
| 3,972,302 | 8/1976 | Sherman | 116/28 R |
| 4,241,328 | 12/1980 | Lobe et al. | 340/474 |
| 4,309,741 | 1/1982 | Smith | 362/72 |
| 4,656,564 | 4/1987 | Felder | 362/72 |
| 4,825,191 | 4/1989 | Ching-Hwei | 340/472 |
| 4,889,303 | 12/1989 | Wolf | 248/160 |
| 4,894,755 | 1/1990 | Chandler | 340/472 |
| 5,099,222 | 3/1992 | Campagna | 340/474 |
| 5,418,696 | 5/1995 | Izzo, Sr. | 340/468 |

Primary Examiner—Jeffery Hofsass
Assistant Examiner—Edward Lefkowitz
Attorney, Agent, or Firm—Scully, Scott Murphy & Presser

[57] ABSTRACT

A bicycle signalling device (1) has flexible arms (4) carrying lamps (5). The arms (4) are mounted on a holder (2) having spring clamps (3) for snap engagement with the handlebars of a bicycle. A battery within the holder (2) powers the lamps (5) operable by switches (10, 12) to indicate whichever direction the cyclist intends to turn. The arms (4) can be bent in any direction by the cyclist to hold the lamps (5) in the best signalling position.

5 Claims, 5 Drawing Sheets

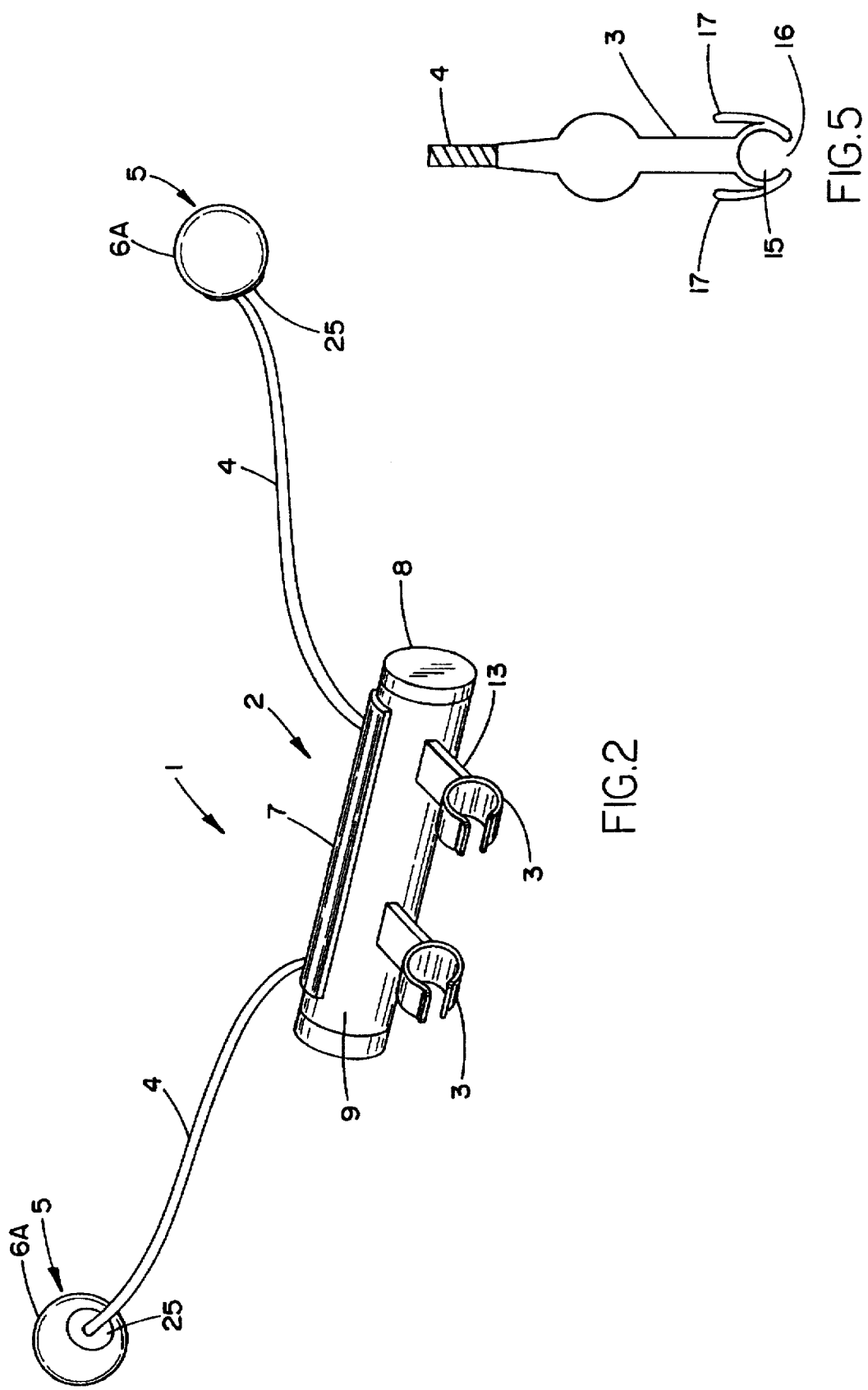

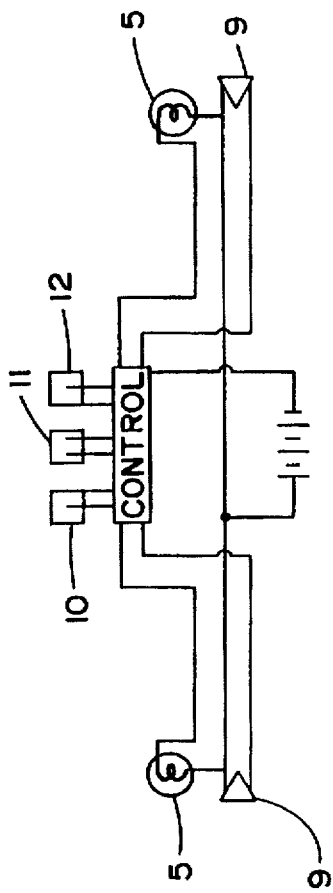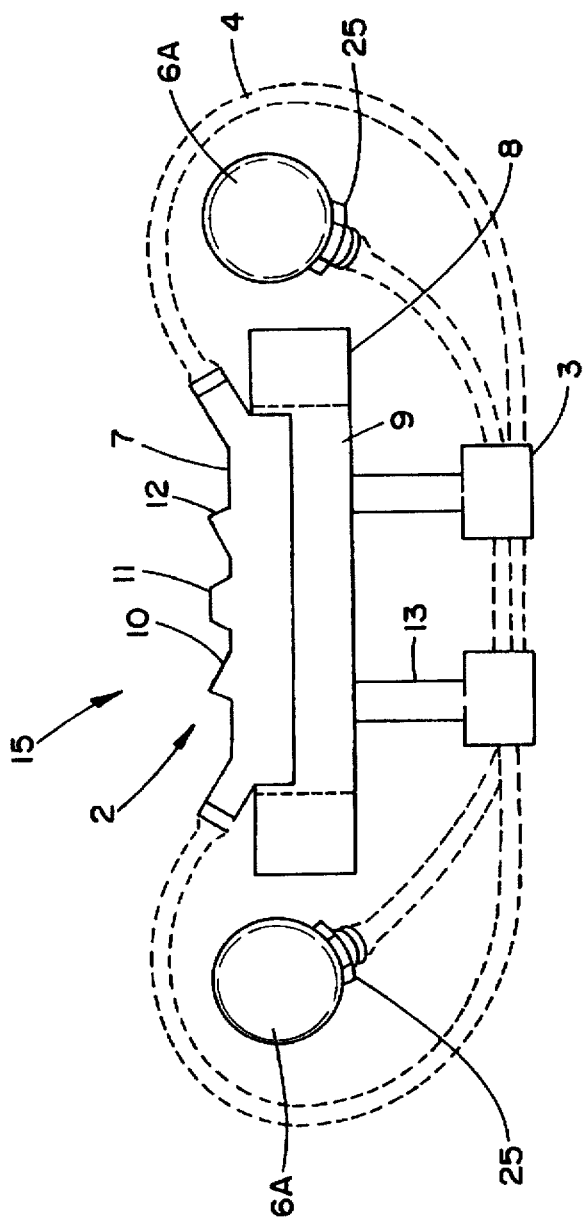

VEHICLE SIGNALLING DEVICE

This is a continuation of application Ser. No. 064,359, filed on May 18, 1993, abandoned, which was a continuation of Ser. No. 854,374, filed on Mar. 19, 1992, now abandoned.

This invention relates to a signalling device for a vehicle, and in particular to a direction and hazard indicator for a two wheeled vehicle such as a bicycle or motor cycle.

It is known for example from German patent specification number 3718025 to provide means for a cyclist to indicate when changing direction using visual indicators attached to a bicycle. German Patent Specification No. 78459 shows a direction indicator for a bicycle having a control housing with a flexible articulated arm carrying a signal lamp. A disadvantage of these indicators is that the cyclist has very limited control over the positioning of the visual indicators to ensure their visibility to other vehicles and pedestrians.

It is an object of the present invention to provide an improved signalling device for vehicles, in particular bicycles, which overcomes this problem.

According to the invention there is provided a vehicle signalling device, comprising an arm carrying indicating means, the arm attached to mounting means for securing the arm to a vehicle, the arm universally movable relative to the mounting means to position and hold the indicating means at a desired signalling position.

In one embodiment of the invention the arm is of flexible material allowing universal bending of the arm in any direction relative to a fixed end of the arm which is attached to the mounting means. Preferably the arm is at least 0.5 meters long.

In a preferred embodiment of the invention the indicating means is a lamp and means is provided for connection of the lamp to a power supply, with switch means for operation of the lamp.

In a further embodiment the arm extends outwardly of a holder to which the mounting means is attached, the switch means being mounted on the holder. Preferably the holder forms a battery housing for reception of a battery to provide the power supply.

In another embodiment an audible indicator is provided on the holder. Preferably means is provided for flashing the lamp and the audible indicator is synchronised with the lamp to give an intermittent sound signal corresponding to the flashing visual signal of the lamp when the lamp is in use. Ideally two arms are provided on the holder, each carrying a lamp.

In a further embodiment the mounting means is at least one spring clip for snap engagement and release of the holder with the vehicle. Preferably each spring clip is mounted on a leg which extends outwardly of the holder. Ideally the leg is of flexible material which allows universal bending of the leg in any direction relative to a fixed end of the leg which is attached to the mounting means.

In some cases an adapter may be provided for mounting the holder on the vehicle, the adapter engageable between the mounting means and the vehicle. The adapter may be provided by a shim or a sleeve engageable with the vehicle body. Formations may be provided on the adapter which are engageable with the mounting means to prevent movement of the mounting means on the vehicle.

As a security feature, the holder may have a lockable compartment for reception of each lamp in a folded stored position.

In some cases the arms may be integrally formed with a vehicle.

In another aspect the invention provides a vehicle signalling device, comprising a body member with mounting means for attachment of the body member to a vehicle, means for generating a light signal and means for positioning the light signal at a desired signalling location relative to the body, with positioning means operable to move the light signal in any desired direction.

The invention will be more clearly understood from the following description of an embodiment thereof, given by way of example only, with reference to the accompanying drawings, in which:

FIG. 2 is a perspective view of the device;

FIG. 3 is a front elevational view of the device showing flexible arms of the device in a folded storage position;

FIG. 5 is a detailed elevational view of a spring clip for attachment of the device to the handlebars of a bicycle;

Figure 11:
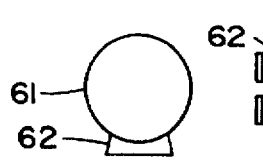
Figure 9:
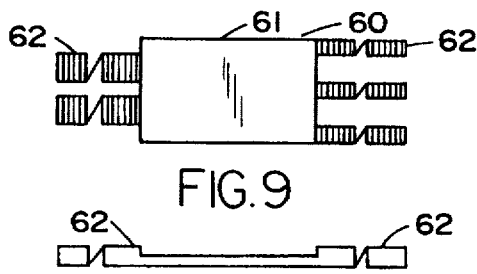
Figure 15:
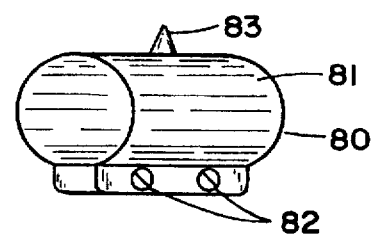
Figure 10:
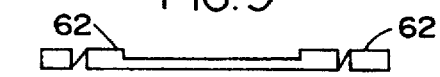
Figure 14:
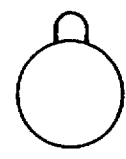
Figure 12:
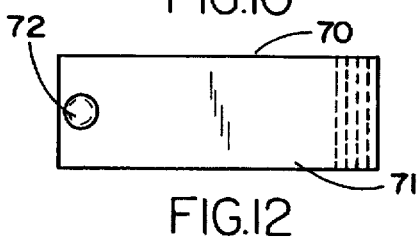
Figure 13:
Figure 8:
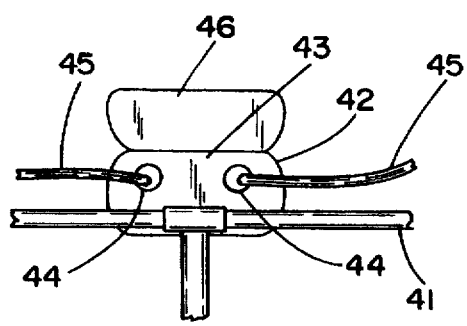
Figure 7:
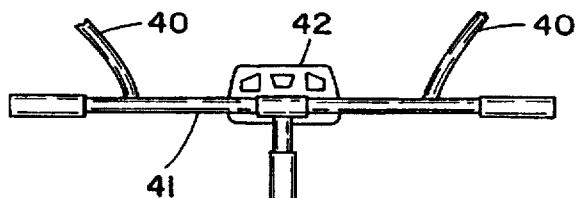

FIGS. 6a–e shows a number of different arrangements of spring clip;

FIG. 7 is a detailed diagrammatic illustration of portion of another bicycle signalling device shown mounted on the handlebars of a bicycle;

FIG. 8 is a detailed diagrammatic illustration of portion of the device of FIG. 7, FIG. 9 is a plan view of a sleeve adapter for use in fitting a signalling device on a bicycle, FIG. 10 is an elevational view of the adapter, FIG. 11 is an end view of the adapter of FIG. 9 in use wrapped around a bicycle handlebar, FIG. 12 is a plan view of another adapter for mounting a signalling device on a bicycle, FIG. 13 is an elevational view of the adapter of FIG. 12, FIG. 14 is an end view of the adapter of FIG. 12 in use mounted on the handlebars of a bicycle, FIG. 15 is a perspective view of another adapter for mounting a signalling device on the handlebars of a bicycle, and FIG. 16 is a circuit diagram for the device of FIGS. 1 to 5.

Referring to the drawings there is illustrated a bicycle signalling device identified generally by the reference numeral 1. The device 1 comprises a holder 2 incorporating a control unit, the holder 2 having two open-jawed spring clamps 3 and two flexible extension arms 4, each arm terminating in a lamp assembly 5.

The holder 2 has a generally cylindrical body 6 with an activating switch plate 7 on a side wall of the body 6. Two removable end caps 8, each containing a piezo electric audio indicator 9 (FIG. 16) are screwed onto each end of the body 6 which houses batteries together with the necessary control circuitry (FIG. 16) to operate the audio indicators 9 and lamp assemblies 5. The activating switch plate 7 contains three surface moulded switches 10, 11 and 12. Switch 20 operates the left-hand lamp assembly and audio indicator, switch 12 operates the right-hand lamp assembly and audio indicator and the middle switch 11 operates both right and left-hand audio indicators together. Operation of switches 10 and 12 simultaneously operates both lamp assemblies but not the audio indicator for hazard warning.

Each extension arm 4 is an open-ended flexible and hollow tube secured to the body 6, each arm 4 enclosing electrical cable for the lamp assembly 5. Each lamp assembly 5 comprises an illumination element, including an amber coloured light-transmitting spherical orb 6. A lens collar 25 acts as a reflecting element.

The spring clamps 3 are secured to the body 6 of the holder 2 by means of short extension legs 13. In this case the extension legs 13 are of relatively rigid material, however in some cases the extension legs 13 may be of a flexible material similar to that used for the extension arms 4, and of any suitable length. Each spring clamp 3 (FIG. 5) is C-shaped in cross-section having a socket 15 with a narrowed mouth 16 resiliently deformable for snap engagement of the socket 15 with the handlebars or other portion of the bicycle frame. Arms 17 project outwardly at each side of the mouth 16 and can be pinched to open the mouth 16 for engagement with the bicycle.

FIG. 3 shows the bicycle signalling device 1 in a folded stored position in which the arms 4 are folded back upon themselves to compact the device for carriage in a bag or the like when not in use.

Figure 1:
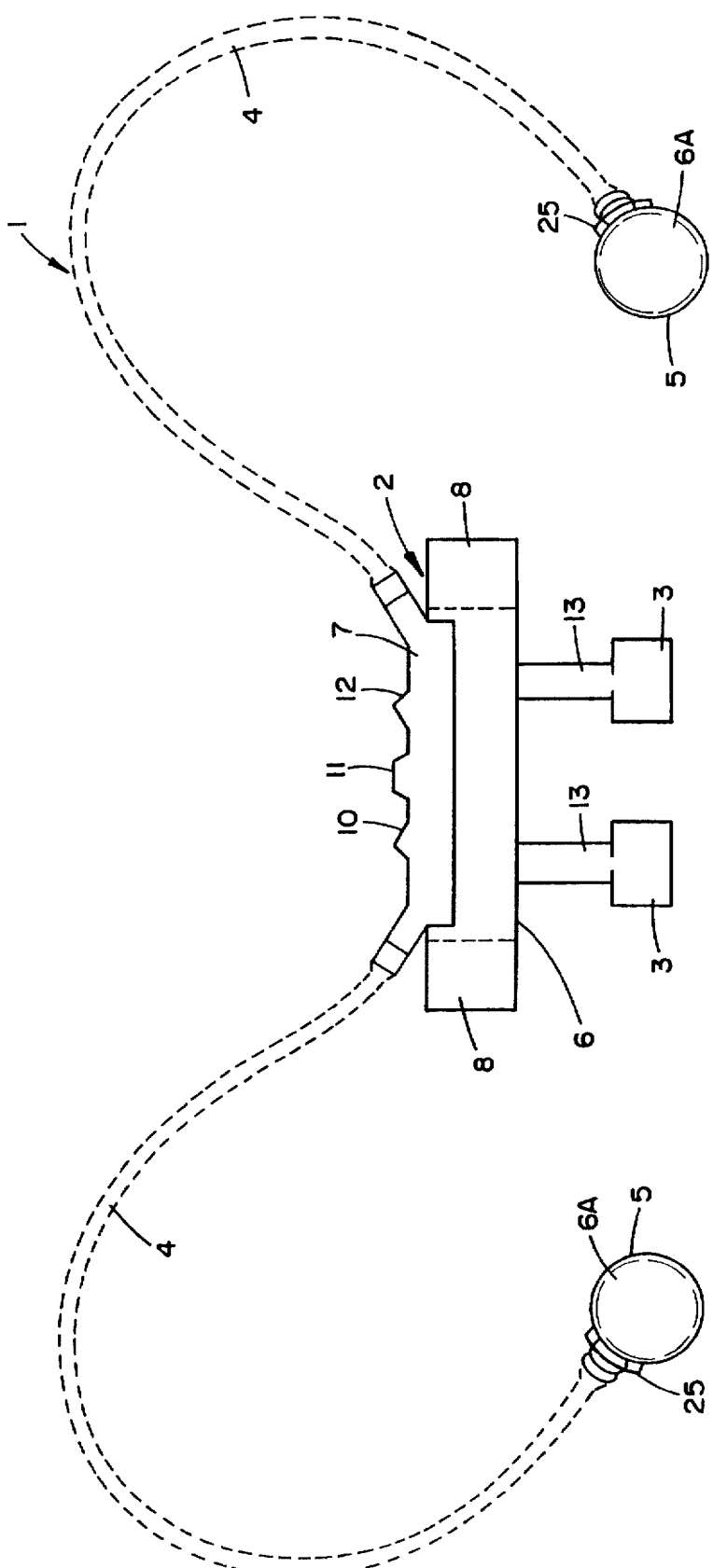
FIG. 1 is a front elevational view of a bicycle signalling device according to the invention.
Figure 4:
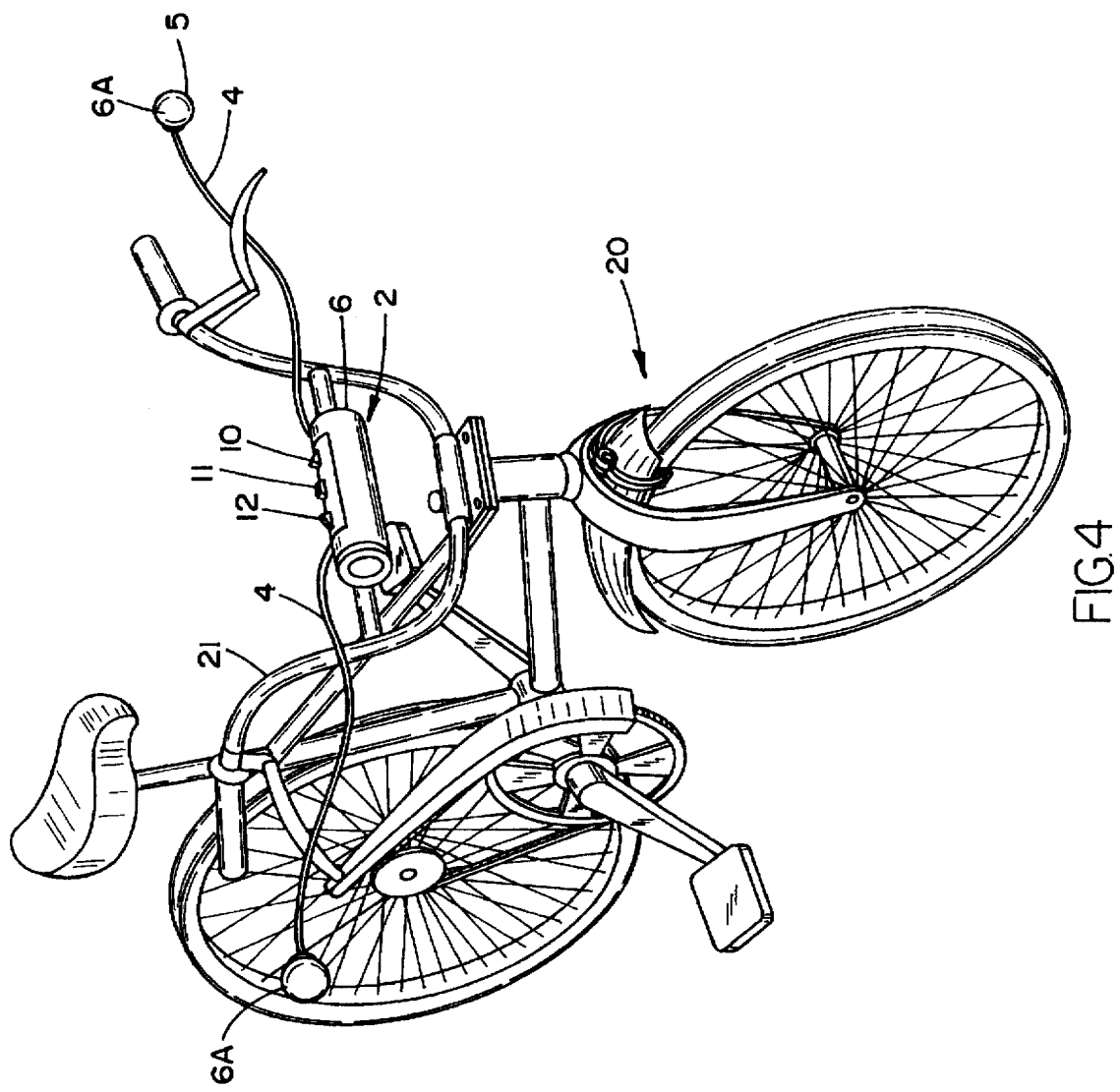
FIG. 4 is a perspective view of the device mounted on a bicycle.

Referring to FIG. 4 the device 1 is shown mounted on a bicycle 20. The clamps 3 are a snap fit on the handlebars 21 of the bicycle 20.

In use, the device 1 is snapped on to the handlebars 21 as shown in FIG. 4. Each of the arms 4 can then be positioned extending laterally outwardly of the handlebars 21 to project to each side of a cyclist in use. Once positioned as required by the cyclist the arms 4 hold their position. As an alternative instead of projecting laterally of the cyclist the arms 4 are in this case sufficiently long enough for a cyclist to wrap the arms 4 around his body and project rearwardly of the cyclist. When approaching a turn the cyclist can by operating one of the switches 10, 12 indicate that he intends to turn left or right as required. Each switch 10, 12 activates both the audio indicator and the lamp assembly 6 which flashes at a frequency of 3 Hz. The centre switch 11 is for audio indication only which will sound continuously while the switch 11 is held continuously.

Figures 6A, 6B, 6C, 6D, 6E:
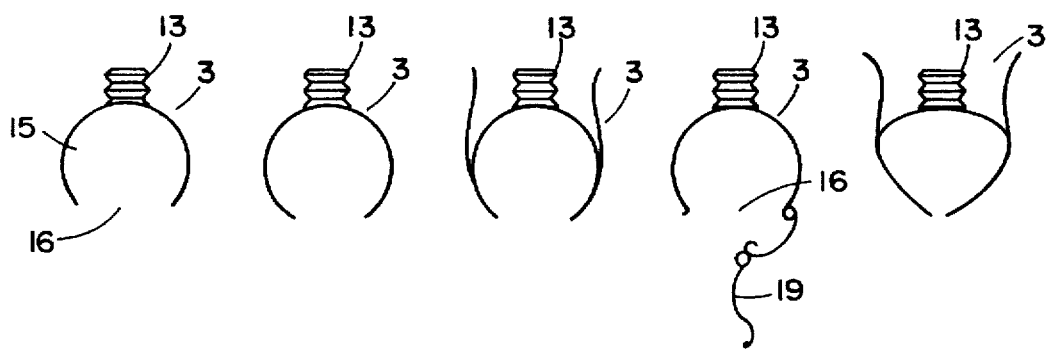

FIGS. 6(a) to (e) show various forms for clamps 3 which can be fused. FIG. 6(d) has a toggle catch 19 for closing the mouth 16 of the clamp 3.

Referring now to FIGS. 7 and 8, there is illustrated portion of another bicycle signalling device. In this case flexible arms 40 for carrying the signalling lamps are integrally formed with the handlebars 41 of a bicycle. A holder 42 carrying the controls for operation of the lamp and audible warning device is mounted centrally on the handlebars 41. The holder 42 has a compartment 43 for reception of lamps 44 mounted on flexible arms 45. The compartment 43 can be closed and locked by means of a hinged cover 46. In this way the lamps 44 can be protected against vandalism while the bicycle is left unattended. Operation of the signalling device is similar to operation of the signalling device described previously with reference to FIGS. 1 to 6.

To enable universal mounting of the signalling devices on different types of bicycle, adapters may be provided for attachment to the bicycle handlebars prior to fitting the indicator on the bicycle handlebars. The adapter may be a sleeve or shim, which is permanently fixed to the bicycle handlebars. Formations may be provided on the adapter to engage the spring clip for attaching the indicator to the bicycle to prevent movement of the indicator on the bicycle during use.

Referring now to FIGS. 9 to 11, there is illustrated an adapter for fitting the signalling device on a bicycle. The adapter 60 is formed by a flag sheet 61 of flexible material having ribbed ends 62. In use, the ribbed ends 62 are cut to a desired size such that the adapter 60 can be wrapped around the handlebars of a bicycle, as shown in FIG. 11 with the ribs 62 meeting. The opening of the spring clip for mounting the device on the handlebars of the bicycle engages either side of the ribs 62 to firmly locate the device on the bicycle. The adapter 60 can be stuck or otherwise firmly attached to the handlebars of the bicycle.

Referring now to FIGS. 12 to 14, another adapter 70 is shown having a body 71 formed by a sheet of flexible material which can be cut to a desired length for mounting around the handlebars of a bicycle. A spud 72 projecting outwardly of the body 71 is engageable within the extension legs 13 to firmly locate the signalling device on the handlebars of a bicycle.

Referring now to FIG. 15, another adapter 80 is shown having a body 81 C-shaped in cross-section with clamp screws 82 for clamping the body 81 to the handlebars of a bicycle. A spud 83 projects outwardly of the body 81 for location within the extension leg 13 of the signalling device to firmly locate the signalling device on the handlebars of a bicycle.

It will be appreciated that the indicator according to the invention advantageously allows the indicating lamps to be positioned in the best location for signalling which will vary according to the different style of bicycle and also with different cyclists.

It is also envisaged that in some cases orbs of light may be generated to provide a light signal and transmitted to a predetermined location, relative to the cyclist without the need for the connecting arms or conventional light bulbs. Various means may be used to achieve this including for example, holographic projection.

It will be appreciated that the bicycle indicator may be of any suitable materials of construction.

The invention is not limited to the embodiment hereinbefore described which may be varied in both construction and detail.

We claim:

1. A bicycle turn signaling device comprising:

a holder;

mounting means on the holder for providing releasable engagement with handlebars on a bicycle;

a pair of separate, elongate pliant arms, each arm having an inner end and an outer end, the inner end of each arm being connected to the holder, the outer end of each arm being universally movable in any direction relative to the holder;

a pair of lamps, each lamp being mounted at the outer end of each arm;

means for connecting each lamp to an electric power supply, said connecting means including switch means for operation of the lamps, said switch means being mounted on the holder;

an audible indicator mounted on the holder, said audible indicator being connected to the electric power supply and to said switch means;

a flashing means for individually flashing each lamp to provide a flashing visual signal; and a sounding means for intermittently sounding the audible indicator to provide an intermittent sound signal, said flashing means being synchronized with said sounding means so that said flashing visual signal corresponds to said intermittent sound signal, wherein each separate, pliant arm is universally bendable in a three-dimensional range so that each lamp can be placed in a desired signaling position at which it will remain.

2. A bicycle turn signaling device comprising:

a holder;

mounting means on the holder for providing releasable engagement with handlebars on a bicycle, said mounting means having a pair of spaced-apart spring clips for snap engagement and release of the signaling device with the handlebars of the bicycle, and a pair of legs extending outwardly of the holder, each spring clip being mounted at a free end of one of the legs;

a pair of separate, elongate pliant arms, each arm having an inner end and an outer end, the inner end of each arm being connected to the holder, the outer end of each arm being universally movable in any direction relative to the holder;

a pair of lamps, each lamp being mounted at the outer end of each arm;

means for connecting each lamp to an electric power supply, said connecting means including switch means for operation of the lamps, said switch means being mounted on the holder;

an audible indicator mounted on the holder, said audible indicator being connected to said electric power supply and to said switch means;

a flashing means for individually flashing each lamp to provide a flashing visual signal; and a sounding means for intermittently sounding the audible indicator to provide an intermittent sound signal, said flashing means being synchronized with said sounding means so that said flashing visual signal corresponds to said intermittent sound signal, wherein each separate, pliant arm is universally bendable in a three-dimensional range so that each lamp can be placed in a desired signaling position at which it will remain.

3. A bicycle turn signaling device as claimed in claim 2, wherein said holder has a battery housing for reception of a battery to provide said electric power supply.

4. The bicycle turn signaling device as claimed in claim 2, wherein each of said spring clips is C-shaped in cross-section and has a socket with a narrowed mouth which is resiliently deformable for snap engagement of said socket with the handlebars of the bicycle.

5. The bicycle turn signaling device as claimed in claim 2, wherein each of said legs is made of flexible material which allows universal bending of the leg in any direction.

\* \* \* \* \*